US010415715B2

(12) United States Patent
Smith, III et al.

(10) Patent No.: US 10,415,715 B2
(45) Date of Patent: *Sep. 17, 2019

(54) SUBSEA BOP CONTROL SYSTEM WITH DUAL-ACTION CHECK VALVE

(71) Applicant: National Coupling Company, Inc., Stafford, TX (US)

(72) Inventors: Robert E. Smith, III, Missouri City, TX (US); Timothy Goggans, Cypress, TX (US); Frank Harold Hollister, Sugar Land, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,658

(22) Filed: Dec. 4, 2018

(65) Prior Publication Data

US 2019/0113146 A1 Apr. 18, 2019

Related U.S. Application Data

(63) Continuation of application No. 16/046,074, filed on Jul. 26, 2018, now Pat. No. 10,174,857, which is a
(Continued)

(51) Int. Cl.
*E21B 33/038* (2006.01)
*E21B 33/064* (2006.01)
*E21B 34/04* (2006.01)
*E21B 34/16* (2006.01)
*F16K 15/02* (2006.01)
*F16K 27/02* (2006.01)
*F16K 27/00* (2006.01)

(52) U.S. Cl.
CPC ........ *F16K 27/0209* (2013.01); *E21B 33/038* (2013.01); *E21B 33/064* (2013.01); *E21B 34/04* (2013.01); *E21B 34/16* (2013.01); *F16K 15/026* (2013.01); *F16K 27/003* (2013.01)

(58) Field of Classification Search
CPC .. E21B 33/0355; E21B 33/038; E21B 33/064; E21B 34/04; E21B 34/16; F16K 15/026; F16K 27/003; F16K 27/0209
See application file for complete search history.

(56) References Cited

U.S. PATENT DOCUMENTS 3,468,337 A * 9/1969 Smirl ............... F16K 15/00
137/493.8
4,301,832 A 11/1981 Smith
(Continued)

FOREIGN PATENT DOCUMENTS

CN 10176173 A 6/2010
GB 2488812 A 12/2012
(Continued)

*Primary Examiner* — Matthew R Buck
(74) *Attorney, Agent, or Firm* — Blank Rome LLP

(57) ABSTRACT

A subsea hydraulic system comprises a dual (or dual action) check valve on a port for connection to a remotely operated vehicle (ROV). The check valve provides backpressure to flow in either direction. This keeps hydraulic fluid in the hydraulic system, and seawater out. If flow needs to return to the ROV, it may flow out the port, subject to a selected back pressure.

4 Claims, 7 Drawing Sheets

Related U.S. Application Data continuation of application No. 15/723,980, filed on Oct. 3, 2017, now Pat. No. 10,054,239, which is a continuation of application No. 15/255,379, filed on Sep. 2, 2016, now Pat. No. 9,810,336.

(60) Provisional application No. 62/239,085, filed on Oct. 8, 2015.

(56) References Cited

U.S. PATENT DOCUMENTS

| | | | | |
|---|---|---|---|---|
| 4,923,602 | A * | 5/1990 | Blood | B01D 35/15 137/493.8 |
| 6,168,400 | B1 * | 1/2001 | Van Davelaar | F16K 17/18 137/454.2 |
| 6,257,268 | B1 * | 7/2001 | Hope | G05D 16/103 137/111 |
| 6,474,359 | B1 | 11/2002 | Smith, III | |
| 7,509,969 | B2 * | 3/2009 | Huang | F16K 15/026 137/226 |
| 8,376,051 | B2 * | 2/2013 | McGrath | E21B 33/06 166/368 |
| 8,684,092 | B2 * | 4/2014 | McGrath | E21B 33/06 166/368 |
| 9,810,336 | B2 * | 11/2017 | Smith, III | E21B 33/038 |
| 10,054,239 | B2 * | 8/2018 | Smith, III | E21B 33/038 |
| 10,174,857 | B2 * | 1/2019 | Smith, III | F16K 27/0209 |
| 2006/0102238 | A1 * | 5/2006 | Watson | F16L 29/007 137/613 |
| 2012/0318519 | A1 | 12/2012 | Webb | |

FOREIGN PATENT DOCUMENTS

| | | |
|---|---|---|
| JP | 2001317641 A | 11/2001 |
| KR | 20000024898 A | 5/2000 |
| WO | 199803766 A1 | 1/1998 |

* cited by examiner

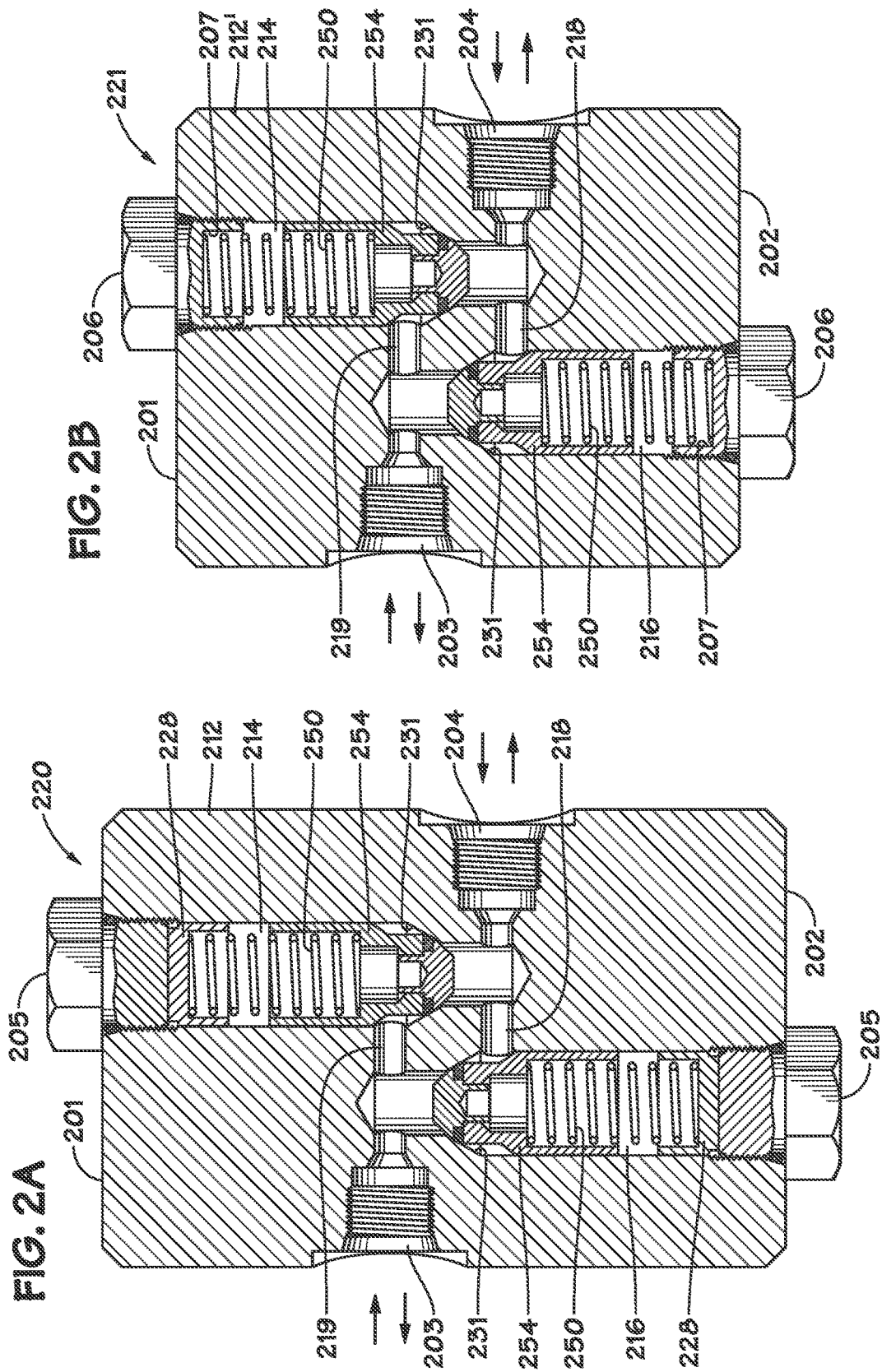

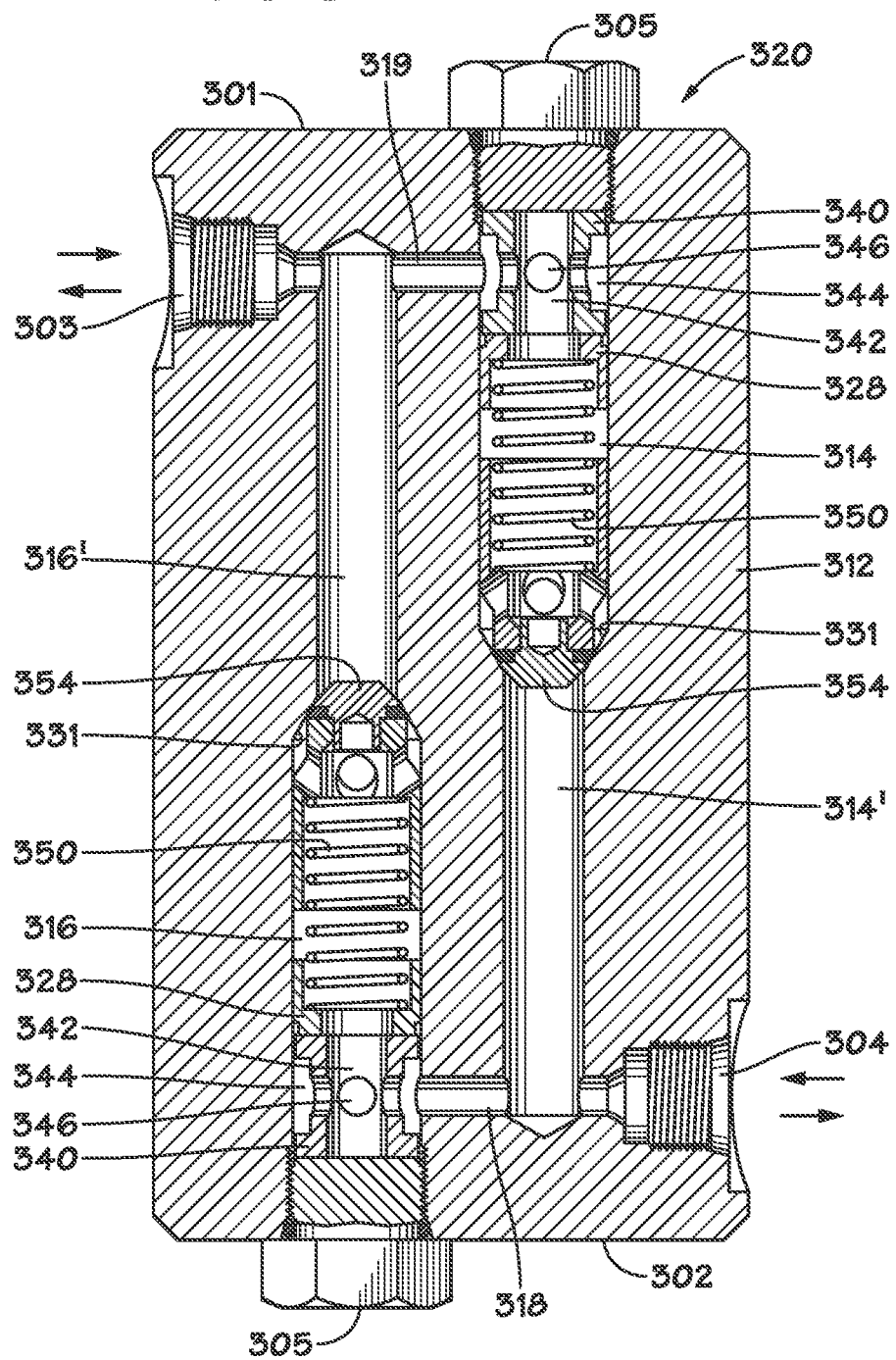

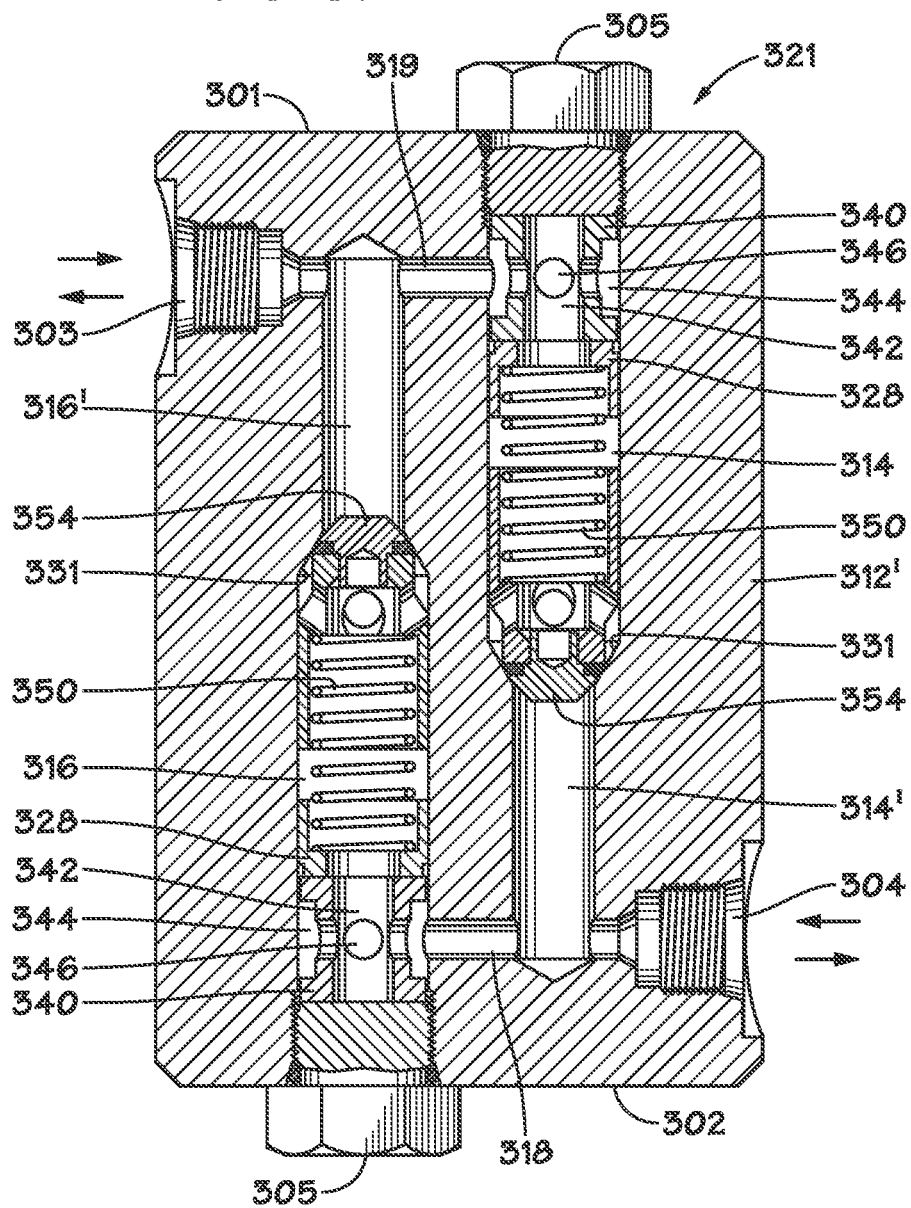

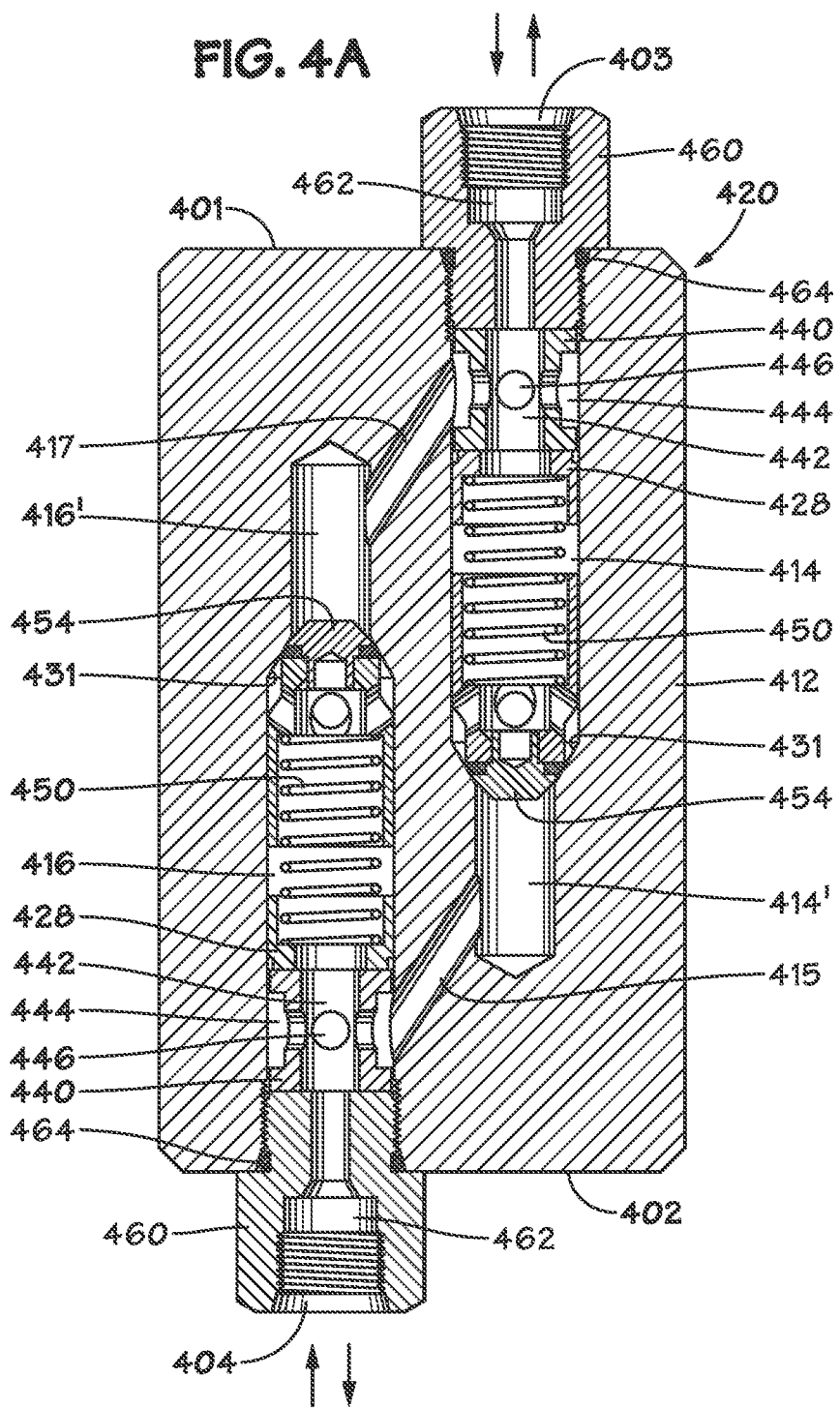

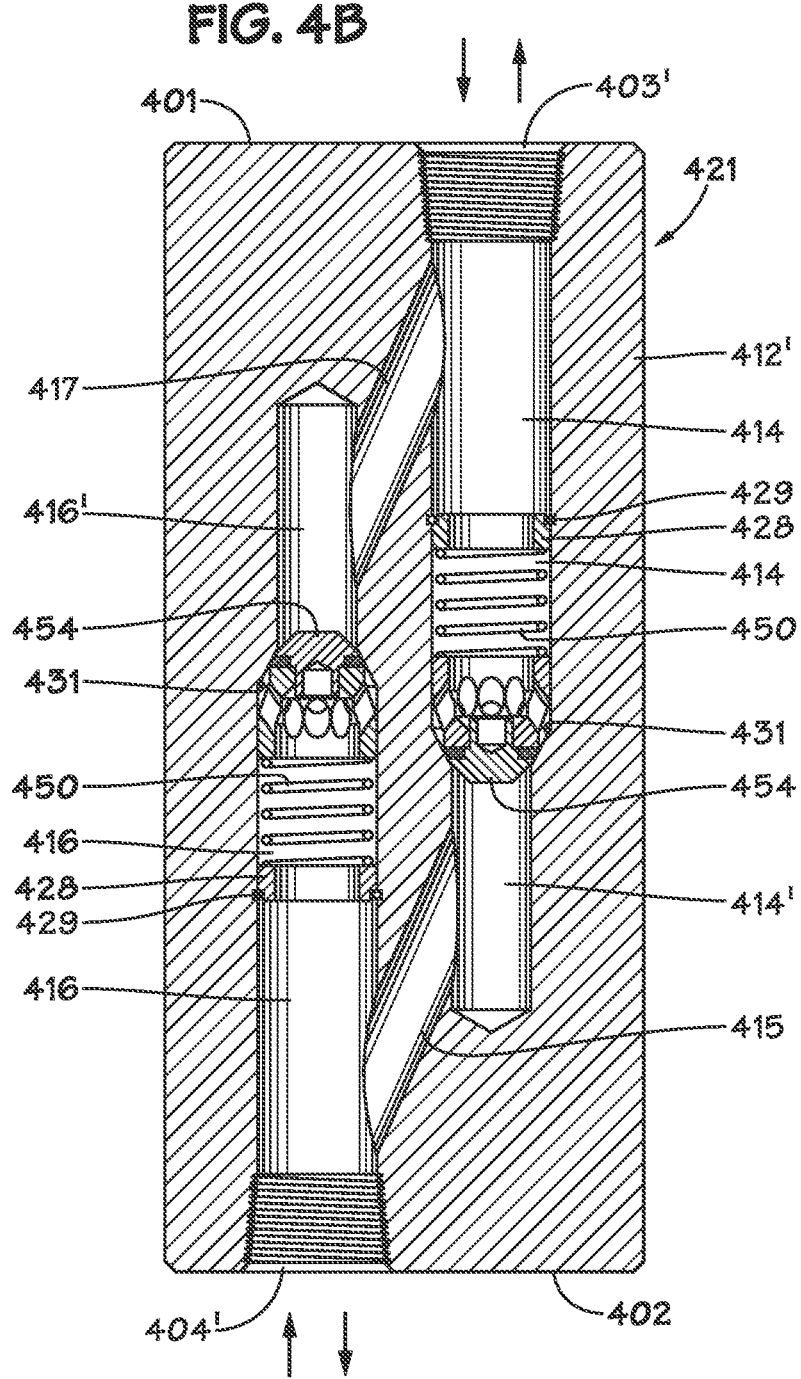

SUBSEA BOP CONTROL SYSTEM WITH DUAL-ACTION CHECK VALVE

CROSS-REFERENCE TO RELATED APPLICATIONS

This application is a continuation of U.S. application Ser. No. 16/046,074 filed on Jul. 26, 2018, (now issued as U.S. Pat. No. 10,174,857) which is a continuation of U.S. application Ser. No. 15/723,980 filed on Oct. 3, 2017, (now issued as U.S. Pat. No. 10,054,239) which is a continuation U.S. application Ser. No. 15/255,379 filed on Sep. 2, 2016, (now issued as U.S. Pat. No. 9,810,336) which claims the benefit of U.S. Provisional Application No. 62/239,085, filed on Oct. 8, 2015, the contents of which are hereby incorporated by reference in their entireties.

FEDERALLY SPONSORED RESEARCH OR DEVELOPMENT

Not Applicable

BACKGROUND OF THE INVENTION

1. Field of the Invention

The present invention generally relates to subsea equipment for oil and gas production. More particularly, it relates to subsea blow-out preventers (BOPs) and other such hydraulically actuated equipment.

2. Description of the Related Art Including Information Disclosed Under 37 CFR 1.97 and 1.98

A blow out preventer is a piece of hydraulically operated equipment used to close in a well (in an emergency) fitted around a drill string or production riser.

In essence, a BOP is a large valve at the top of a well that may be closed if the drilling crew loses control of formation fluids. By closing this valve (usually operated remotely via hydraulic actuators), the drilling crew usually regains control of the reservoir, and procedures can then be initiated to increase the mud density until it is possible to open the BOP and retain pressure control of the formation. BOPs come in a variety of styles, sizes and pressure ratings. Some can effectively close over an open wellbore, some are designed to seal around tubular components in the well (drillpipe, casing or tubing) and others are fitted with hardened steel shearing surfaces that can actually cut through drillpipe. Since BOPs are critically important to the safety of the crew, the rig and the wellbore itself, BOPs are inspected, tested and refurbished at regular intervals determined by a combination of risk assessment, local practice, well type and legal requirements. BOP tests vary from daily function testing on critical wells to monthly or less frequent testing on wells thought to have low probability of well control problems.

Although typically controlled from the surface via umbilical lines, subsea BOPs often are equipped with a hydraulic port for connection to an underwater remotely operated vehicle (ROV). In this way, if the BOP cannot be closed via the surface controls, hydraulic fluid (under pressure) supplied by an ROV connected to the BOP control circuits may be able to close the BOP.

In any subsea hydraulic connection, there is a risk that seawater may enter the hydraulic system and contaminate it and there is a risk that hydraulic fluid may leak out of the hydraulic connection and contaminate the marine environment. In the past, ROV ports have been plugged, manual valves which can be actuated by a ROV have been used, and conventional single check valves have been used to address this problem. None of the previously tried solutions mentioned above will permit return flow out of the ROV port. The present invention addresses this problem in a novel way.

BRIEF SUMMARY OF THE INVENTION

In subsea ROV ports, problems may exist with seawater entering the hydraulic system and/or hydraulic fluid being discharged into the sea. A dual-action check valve according to the invention provides backpressure to flow in either direction. This keeps hydraulic fluid in the hydraulic system, and seawater out. If flow needs to return out the ROV port, it is free to flow out the port, subject to a back pressure determined by a combination of the hydrostatic pressure and the spring rate of the poppet spring.

In certain embodiments of the present invention, two check valves are configured so that flow can occur in either direction, subject to a back pressure which may be varied by selection by the spring rate(s) of spring-loaded poppet valves within the apparatus. In another embodiment, a single dual-acting valve allows flow to occur in either direction, subject to back pressures that may be determined by the selection of springs having certain spring rates.

BRIEF DESCRIPTION OF THE SEVERAL VIEWS OF THE DRAWING(S)

FIG. 2A is a cross-sectional view of a first embodiment of a dual-action check valve according to the invention.

FIG. 2B is a cross-sectional view of a second embodiment of a dual-action check valve according to the invention.

FIG. 3A is a cross-sectional view of a third embodiment of a dual-action check valve according to the invention.

FIG. 3B is a cross-sectional view of a fourth embodiment of a dual-action check valve according to the invention.

FIG. 4A is a cross-sectional view of a fifth embodiment of a dual-action check valve according to the invention.

FIG. 4B is a cross-sectional view of a sixth embodiment of a dual-action check valve according to the invention.

DETAILED DESCRIPTION OF THE INVENTION

The invention may best be understood by reference to the accompanying drawing figures which illustrate various, representative embodiments of the invention.

Figure 1:
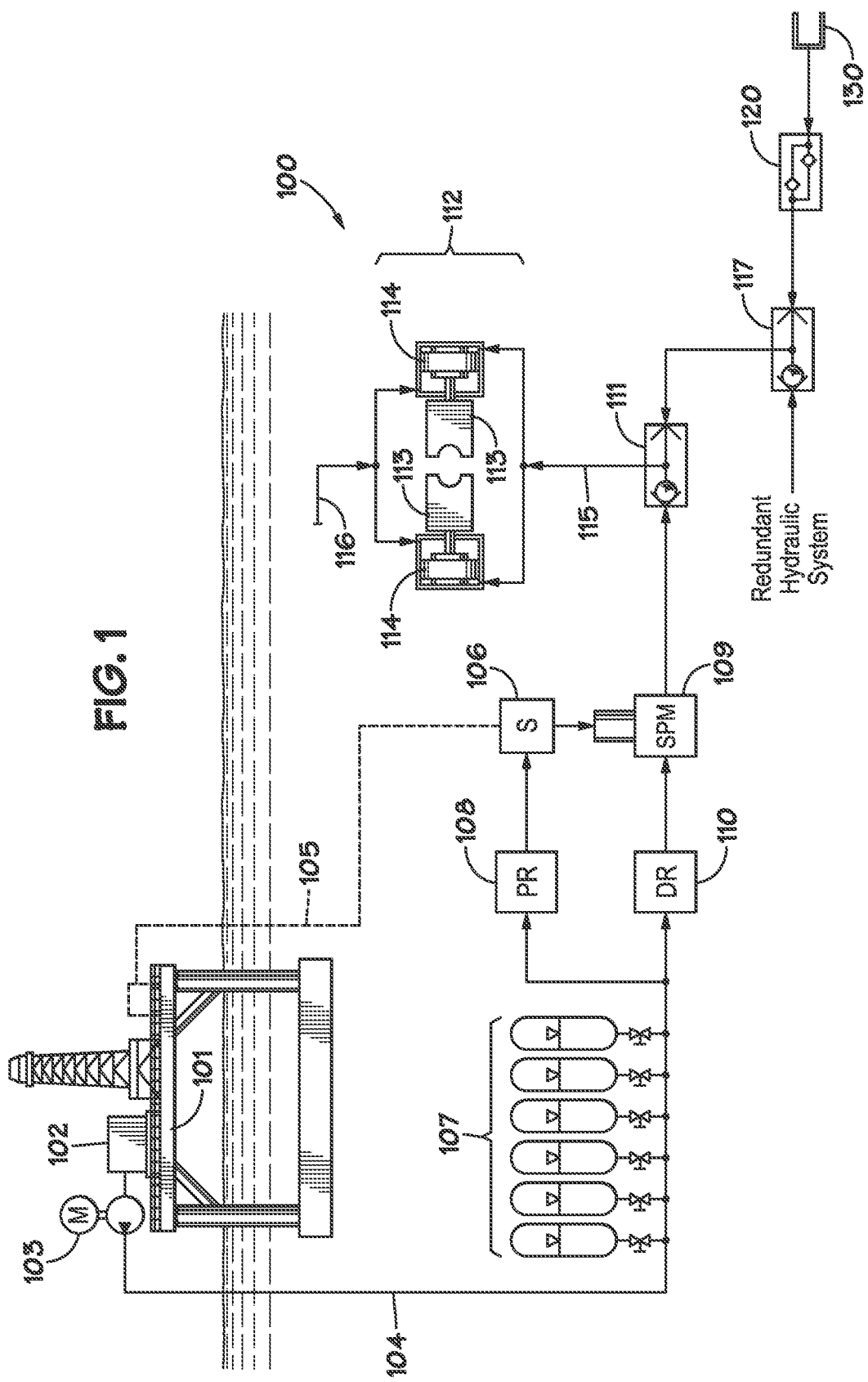
FIG. 1 is a schematic diagram of a subsea BOP hydraulic system according to one embodiment of the invention.

Referring first to FIG. 1, a subsea BOP control system equipped with a dual-action check valve according to the invention is shown schematically. Subsea BOP control system 100 comprises offshore platform 101 having hydraulic fluid reservoir [supply tank] 102 in fluid communication with motor-driven hydraulic pump 103 which may supply hydraulic fluid under pressure to hydraulic accumulators 107 via hydraulic umbilical 104.

Electrical signal line 105 controls solenoid valve 106 which receives pressurized hydraulic fluid from pilot pressure regulator 108. When selected "open" via signal line 105, solenoid valve 106 supplies pressurized hydraulic fluid to open sub-plate mounted valve 109. In the "open" state, sub-plate mounted valve 109 allows pressurized hydraulic fluid from drilling pressure regulator 110 to flow to shuttle valve 111 and thence to closing circuit 115 of BOP 112.

Closing circuit 115 directs pressurized hydraulic fluid to the indicated sides of pistons 114 causing ram closure members 113 to seal the well. As is conventional, pressurized hydraulic fluid may be directed to the indicated sides of pistons 114 via opening circuit 116 to withdraw ram closure members 113 thereby opening BOP 112.

Subsea BOP control system 100 provides two additional means for closing BOP 112. Shuttle valve 117 allows pressurized hydraulic fluid to be supplied to closing circuit 115 by a redundant hydraulic system or, alternatively, by a remotely operated vehicle (ROV) via dual-action check valve 120 and ROV port 130. Dual-action check valve 120 provides backpressure to fluid flow in either direction. This keeps hydraulic fluid in the hydraulic system, and seawater out.

Referring now to FIG. 2A, a first embodiment 220 of dual-action check valve 120 in FIG. 1 is illustrated.

Dual-action check valve 220 comprises body 212 having first end 201 and opposing second end 202. Body 212 may be made of any suitable material and may be any suitable shape. In one particular preferred embodiment, body 212 is fabricated of 316L stainless steel. In the illustrated embodiment, body 212 is generally cylindrical.

First port 203 and second port 204 are provided opposite one another in the side of body 212. First port 203 and/or second port 204 may be internally threaded for connection to hydraulic lines or conduits.

First blind bore 214 is provided in first end 201 of body 212. Second blind bore 216 is provided in second end 202 of body 212. First blind bore 214 and second blind bore 216 may have sections of different inside diameter (i.d.) with inclined shoulders 231 connecting the different sections. First blind bore 214 and second blind bore 216 may be sealed by plugs 205.

First cross bore 218 interconnects first blind bore 214, second blind bore 216 and second port 204 as shown. Second cross bore 219 interconnects first blind bore 214, second blind bore 216 and first port 203 as shown.

Poppet valves 254 are provided in first blind bore 214 and second blind bore 216. Poppet valves 254 are urged to seat against inclined shoulders 231 by poppet springs 250 which act against spring collars 228 secured by plugs 205.

In operation, if hydraulic fluid enters port 203 with sufficient pressure to open poppet valve 254 in bore 216, it may flow via cross bore 218 and exit at port 204. Conversely, if hydraulic fluid enters port 204 with sufficient pressure to open poppet valve 254 in bore 214, it may flow via cross bore 219 and exit at port 203. It will be appreciated by those skilled in the art that the pressure required to open poppet valves 254 depends both upon the closing force of poppet springs 250 and the pressure of the fluid on the opposite side of poppet valve 254. The poppet valve 254 in bore 214 may have the same or a different spring rate than the poppet valve 254 in bore 216. By selecting different spring rates, the check valve opening pressure in a first direction may be made different from the check valve opening pressure in an opposing second direction.

A second embodiment 221 of dual-action check valve 120 in FIG. 1 is illustrated in FIG. 2B. This embodiment is substantially the same as the first embodiment illustrated in FIG. 2A and described, above. However, in the second embodiment, dual-action check valve 221 is provided with plugs 206 having an integral spring seat comprised of recess 207. This eliminates the need for spring collars 228 which both reduces the parts count of dual-action check valve 221 relative to that of dual-action check valve 220 and permits the longitudinal dimension of body 212' to be less than that of body 212 thereby reducing the size, weight and material required for the device.

Referring now to FIG. 3A, a third embodiment 320 of dual-action check valve 120 in FIG. 1 is illustrated.

Dual-action check valve 320 comprises body 312 having first end 301 and opposing second end 302. Body 312 may be made of any suitable material and may be any suitable shape. In one particular preferred embodiment, body 312 is fabricated of 316L stainless steel. In the illustrated embodiment, body 312 is generally cylindrical.

First port 303 and second port 304 are provided opposite one another in the side of body 312. First port 303 and/or second port 304 may be internally threaded for connection to hydraulic lines or conduits.

First blind bore 314 is provided in first end 301 of body 312. Second blind bore 316 is provided in second end 302 of body 312. First blind bore 314 and second blind bore 316 may have sections of different inside diameter (i.d.) with inclined shoulders 331 connecting the different sections 314 to 314' and 316 to 316'). First blind bore 314 and second blind bore 316 may be sealed by plugs 305.

Dual-action check valve 320 is equipped with cross-flow pieces 340 situated between plugs 305 and spring collars 328. Cross-flow pieces 340 may have a generally cylindrical body sized to fit within bores 314 and 316 and a central axial bore 342. The outer cylindrical surface of cross-flow pieces 340 may have annular recess 344. Internal radial ports 346 provide fluid communication between annular recess 344 and central axial bore 342.

First cross bore 318 interconnects first blind bore 314', second blind bore 316 (at the location of cross-flow piece 340) and second port 304 as shown. Second cross bore 319 interconnects first blind bore 314 (at the location of cross-flow piece 340), second blind bore 316' and first port 303 as shown.

Poppet valves 354 are provided in first blind bore 314 and second blind bore 316. Poppet valves 354 are urged to seat against inclined shoulders 331 by poppet springs 350 which act against spring collars 328 secured by plugs 305.

In operation, if hydraulic fluid enters port 303 with sufficient pressure to open poppet valve 354 in bore 316, it may flow via cross bore 318 and exit at port 304. Conversely, if hydraulic fluid enters port 304 with sufficient pressure to open poppet valve 354 in bore 314, it may flow via cross bore 319 and exit at port 303. It will be appreciated by those skilled in the art that the pressure required to open poppet valves 354 depends both upon the closing force of poppet springs 350 and the pressure of the fluid on the opposite side of poppet valve 354. The poppet valve 354 in bore 314 may have the same or a different spring rate than the poppet valve 354 in bore 316. By selecting different spring rates, the check valve opening pressure in a first direction may be made different from the check valve opening pressure in an opposing second direction.

A fourth embodiment 321 of dual-action check valve 120 in FIG. 1 is illustrated in FIG. 3B. This embodiment is substantially the same as the third embodiment illustrated in FIG. 3A and described, above. However, in the fourth embodiment, dual-action check valve 321 has a shorter body 312' made possible by reducing the lengths of first blind bore section 314' and second blind bore section 316'. In this way, the size, weight and material required for the device may be reduced.

Referring now to FIG. 4A, a fifth embodiment 420 of dual-action check valve 120 in FIG. 1 is illustrated.

Dual-action check valve 420 comprises body 412 having first end 401 and opposing second end 402. Body 412 may be made of any suitable material and may be any suitable shape. In one particular preferred embodiment, body 412 is fabricated of 316L stainless steel. In the illustrated embodiment, body 412 is generally cylindrical.

First blind bore 414 is provided in first end 401 of body 412. Second blind bore 416 is provided in second end 402 of body 412. First blind bore 414 and second blind bore 416 may have sections of different inside diameter (i.d.) with inclined shoulders 431 connecting the different sections 414 to 414' and 416 to 416'). First blind bore 414 and second blind bore 416 may be provided with threaded retainers 460. Retainers 460 have a central axial bore 462 a portion of which may be internally threaded to form first port 403 and second port 404.

Dual-action check valve 420 is equipped with cross-flow pieces 440 situated between retainers 460 and spring collars 428. Cross-flow pieces 440 may have a generally cylindrical body sized to fit within bores 414 and 416 and a central axial bore 442. The outer cylindrical surface of cross-flow pieces 440 may have annular recess 444. Internal radial ports 446 provide fluid communication between annular recess 444 and central axial bore 442.

First angled internal cross bore 415 interconnects first blind bore 414' and second blind bore 416 (at the location of cross-flow piece 440) as shown. First angled internal cross bore 415 is also in fluid communication with second port 404 (via cross-flow piece 440 in bore 416). Second angled internal cross bore 417 interconnects first blind bore 414 (at the location of cross-flow piece 440) and second blind bore 416', as shown. Second angled internal cross bore 417 is in fluid communication with first port 403 (via cross-flow piece 440 in bore 414). Bores 414 and 416 may be sized and spaced so as to permit angled internal cross bores 415 and 417 to be drilled through the openings in the ends 401 and 402 of body 412 created by blind bores 414 and 416.

Poppet valves 454 are provided in first blind bore 414 and second blind bore 416. Poppet valves 454 are urged to seat against inclined shoulders 431 by poppet springs 450 which act against spring collars 428 secured by retainers 405.

In operation, if hydraulic fluid enters port 403 and second angled internal cross bore 417 with sufficient pressure to open poppet valve 454 in bore 416, it may flow through cross-flow piece 440 in bore 416 and exit at port 404. Conversely, if hydraulic fluid enters port 404 and first angled internal cross bore 415 with sufficient pressure to open poppet valve 454 in bore 414, it may flow through cross-flow piece 440 in bore 414 and exit at port 403. It will be appreciated by those skilled in the art that the pressure required to open poppet valves 454 depends both upon the closing force of poppet springs 450 and the pressure of the fluid on the opposite side of poppet valve 454. The poppet valve 454 in bore 414 may have the same or a different spring rate than the poppet valve 454 in bore 416. By selecting different spring rates, the check valve opening pressure in a first direction may be made different from the check valve opening pressure in an opposing second direction.

A sixth embodiment 421 of dual-action check valve 120 in FIG. 1 is illustrated in FIG. 4B. This embodiment is substantially the same as the fifth embodiment illustrated in FIG. 4A and described, above. However, in the sixth embodiment, dual-action check valve 421 has spring collars 428 secured in bores 414 and 416 with retainer clips 429 and the portions of bores 414 and 416 proximate ends 401 and 402, respectively, are internally threaded for connection to hydraulic lines or conduits. This eliminates the need for retainers 460. In this way, the size, weight and material required for the device may be reduced.

Figure 5:
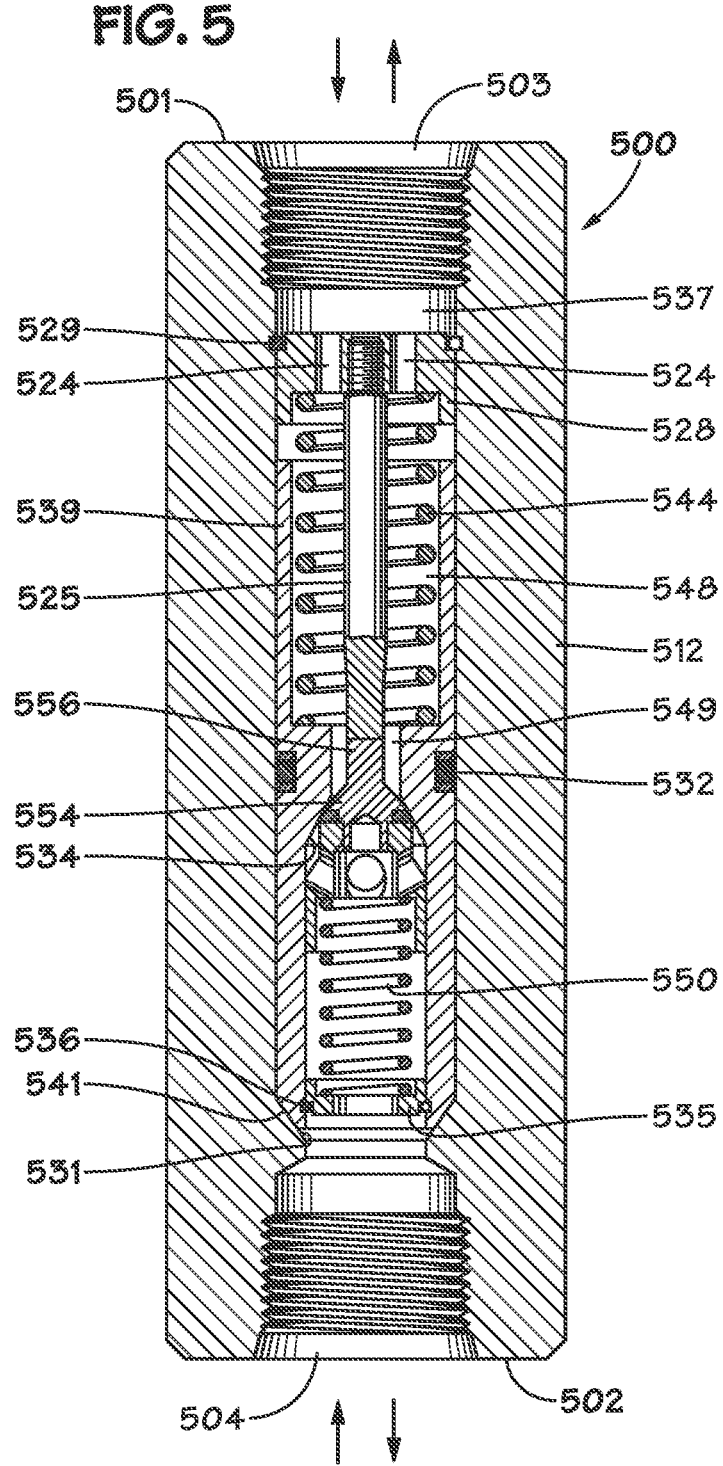
FIG. 5 is a cross-sectional view of a seventh embodiment of a dual-action check valve according to the invention.

Referring now to FIG. 5, a seventh embodiment of a two-way check valve according to the present invention is shown that comprises a single poppet valve.

2-way check valve 500 comprises body 512 having first end 501 and opposing second end 502. Body 512 may be made of any suitable material and may be any suitable shape. In one particular preferred embodiment, body 512 is fabricated of 316L stainless steel. In the illustrated embodiment, body 512 is generally cylindrical.

First port 503 is provided in first end 501 of body 512 and second port 504 is provided in second end 502 of body 512. Ports 503 and 504 may be internally threaded for connection to hydraulic fluid lines and/or conduits.

Sleeve 539 is in sliding engagement with central axial bore 537 of body 512. The first end of the sleeve has an inclined face 541 that abuts inclined shoulder 531 in the bore. The second end of the sleeve, when in the closed position shown in FIG. 5, is spaced from spring collar 528 which is held in the bore with retainer clip 529. Spring collar 528 includes at least two passages 524 therethrough and an actuator 525 extending longitudinally therefrom. When sleeve 539 moves longitudinally so that inclined face 541 is spaced away from inclined shoulder 531, actuator 525 opens poppet valve 554 by contacting poppet valve actuator 556. Sleeve 539 is urged longitudinally toward the spring collar 528 by the pressure of hydraulic fluid acting on the sleeve through second port 504. Thus, hydraulic fluid entering port 504 and flowing through bore 537 urges sleeve 539 axially until the sleeve contacts spring collar 528. When sleeve 539 moves axially, actuator 525 blocks the poppet valve and forces the poppet valve open to allow hydraulic fluid to move through passageway 549 in the sleeve and through passages 524 in the spring collar.

To keep the valve closed in the absence of hydraulic pressure entering second port 504, spring 544 is positioned in bore section 548 within sleeve 539. Spring 544 biases the sleeve to the closed position where inclined face 541 is engaged to inclined shoulder 531. At an intermediate location on sleeve 539 seal 532 provides a sliding fluid seal between the outer circumference of the sleeve and the bore in the coupling member. Seal 532 may comprise an O-ring flanked by backup seals.

If hydraulic fluid pressure in the fluid lines connected to fist port 503 exceeds a predetermined level, the pressure urges poppet valve 554 away from valve seat 534 in sleeve 539, compressing spring 550 to allow the flow of hydraulic fluid through the dual-action check valve in a first direction. Spring 550 may be held in place by spring collar 535 which includes a central passage therethrough and a retainer clip 536 to hold the spring collar in place. Spring 544 may be selected to have the same or a different spring rate [strength] than spring 550.

The dual-action check valve illustrated in FIG. 5 is utilized as a bleed valve in the undersea hydraulic coupling member disclosed in U.S. Pat. No. 6,474,359 to Robert E. Smith, III. The disclosure of U.S. Pat. No. 6,474,359 is hereby incorporated by reference in its entirety. In an embodiment, the dual-action check valve illustrated in FIG. 5 may be incorporated into a male hydraulic coupling member as disclosed in U.S. Pat. No. 6,474,359 and could thereby comprise both ROV port 130 and dual-action check valve 120 in the BOP control system illustrated in FIG. 1 for use with ROVs having a female hydraulic coupling member. In yet another embodiment, the two-way check valve of FIG. 5 may be incorporated into a female hydraulic coupling member configured for connection to an ROV having a corresponding male hydraulic coupling member.

The foregoing presents particular embodiments of a system embodying the principles of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A dual-action check valve comprising:
    a body having a first bore in a first end of the body said first bore having a first end open to the first end of the body and a second end within the body and a second bore in a second, opposing end of the body said second bore having a first end open to the second end of the body and a second end within the body, the second bore being substantially parallel to the first bore;
    a first check valve in said first bore;
    a second check valve in said second bore;
    a first cross bore interconnecting the first and second bores at a first location;
    a second cross bore interconnecting the first and second bores at a second location remote from the first location;
    a first plug sealing the first end of the first bore in the first end of the body and securing the first check valve in the first bore; and,
    a second plug sealing the first end of the second bore in the second end of the body and securing the second check valve in the second bore,
    wherein the first bore in the first end of the body has a first section having a first internal diameter (i.d.), a second section having a second i.d. that is less than the first i.d., and a first inclined shoulder between the first section and the second section,
    the first check valve in the first bore is sized and configured to seal against the first inclined shoulder,
    the second bore in the second end of the body has a first section having a first internal diameter (i.d.), a second section having a second i.d. that is less than the first i.d., and a second inclined shoulder between the first section and the second section,
    the second check valve in the second bore is sized and configured to seal against the second inclined shoulder,
    the first cross bore interconnects the second section of the first bore with the first section of the second bore, and
    the second cross bore interconnects the second section of the second bore with the first section of the first bore.

2. The dual-action check valve recited in claim 1 wherein the first check valve is a spring-loaded valve.

3. The dual-action check valve recited in claim 2 wherein the first plug has a recess in an end thereof sized and spaced to retain one end of a spring of the first check valve in the first bore sealed by the first plug.

4. The dual-action check valve recited in claim 1 wherein both the first check valve and the second check valve are spring-loaded valves and a spring in the first check valve has a first spring rate and a spring in the second check valve has a second spring rate that is different from the first spring rate.

* * * * *